United States Patent Office 3,388,167
Patented June 11, 1968

3,388,167
β-BROMO-ETHYL ARYL THIO-ETHERS
Shuichi Ishida, Omiya, and Shigeki Kirihara and Shinichi Usukura, Tokyo, Japan, assignors to Nippon Kayaku Kabushiki Kaisha, Tokyo, Japan, a corporation of Japan
No Drawing. Continuation-in-part of application Ser. No. 383,901, July 20, 1964. This application Mar. 8, 1965, Ser. No. 438,031
Claims priority, application Japan, July 23, 1963, 38/37,186; May 15, 1964, 39/27,231; June 16, 1964, 39/33,736
9 Claims. (Cl. 260—609)

ABSTRACT OF THE DISCLOSURE

Ring-substituted β-bromo-ethyl aryl thio-ethers of the formula

R—S—CH$_2$—CH$_2$—Br wherein R represents phenyl monosubstituted by alkoxy, alkoxycarbonyl, nitro, formyl or, in the o- or m-position relative to the —S—CH$_2$—CH$_2$—Br group, by alkyl or a halogen atom; disubstituted phenyl substituted by two of the following: halogen, alkyl or alkoxy groups; α- or β-naphthyl which is unsubstituted or monosubstituted by a halogen atom, the nitro or formyl group or by alkyl, alkoxy or alkoxycarbonyl; or disubstituted α- or β-naphthyl having the two substituents selected from the following: halogen, alkyl or alkoxy radicals; are very effective in combatting noxious Acarinae, such as spider mites and the like and their stages of development and thus are well suited as acaricides. Methods of preparation and use of the acaricidal compounds are disclosed.

---

This application is a continuation-in-part of our copending application Ser. No. 383,901, filed July 20, 1964 (now abandoned).

This invention relates to new aromatic-aliphatic thio-ethers which are useful as active ingredients for the combatting of Acarinae and their stages of development.

A number of aromatic-aliphatic thio-ethers which are halogenated in the aliphatic side chain have been known as insecticides, in particular for the control of aphids. Such compounds are, e.g., certain halogeno-alkyl-phenyl sulfides, thio-cresols and tolyl-alkyl-thio-ethers. Insecticides, and especially aphicides are generally not effective against Acarinae.

It is known that plant parasitic spider mites of the Tetranychidae family cause much damage to apple, orange, pear, cherry, cucumber and carnation plantations and the like. Therefore, numerous acaricidal compounds for combatting these spider mites have been in use already. However, these pests quickly develop resistance against the usually employed acaricidal agents so that a decrease in the action of the conventionally applied agents is unavoidable. For practical purposes it is, therefore, important to avoid the development of resistant strains of mites and to find new acaricides against which no resistance has yet developed, and which in particular destroy the eggs of these spider mites.

It has now been found that, surprisingly, new ring-substituted β-bromo-ethyl aryl thio-ethers of the formula R—S—CH$_2$—CH$_2$—Br    (I)

wherein R represents phenyl monosubstituted by alkoxy, alkoxycarbonyl, nitro, formyl or, in the o- or m-position, relative to the —S—CH$_2$—CH$_2$—Br group, by alkyl or a halogen atom; disubstituted phenyl substituted by two of the following: halogen, alkyl or alkoxy groups; α- or β-naphthyl which is unsubstituted or monosubstituted by a halogen atom, the nitro or formyl group or by alkyl, alkoxy or alkoxycarbonyl; or disubstituted α- or β-naphthyl having the two substituents selected from the following: halogen, alkyl or alkoxy radicals; are very effective in combatting noxious Acarinae, such as spider mites and the like and their stages of development and thus are well suited as acaricides. These new agents have a special importance for the protection of plants against infestation with noxious Acarinae, and meet especially well the above-described requirements for an effective control of parasitic spider mites in fruit groves and the like plantations. The active agents according to the invention have a particularly good action on the eggs of spider mites. Moreover, they have a peculiar ovicidal effect in that not only the laid eggs but also the eggs in the body of the female adults are killed, so that eggs laid by the treated female adults cannot hatch.

Since mites and mite eggs generally occur at the same time, it is often advantageous to use the agents of the invention in mixture with other acaricidally active ingredients such as alkyl 4,4'-dichlorobenzilates which have a special effect on the adult stages. They can also be mixed with fungicides.

Especially preferred active agents of the general Formula I are those in which R is a phenyl radical which is monosubstituted in the o- or m-position; preferred substituents in the aforesaid positions are in particular Cl, CH$_3$ and —CO—OCH$_3$.

Preferred substituents of the aromatic radical R when the latter is mono-substituted, are in particular the following: alkyl radicals of 1 to 4 carbon atoms such as the methyl group, chlorine, fluorine, and bromine, alkoxy radicals of 1 to 4 carbon atoms, especially the methoxy group, alkoxy-carbonyl radicals of 2 to 5 carbon atoms, nitro and formyl. When the aromatic radical R is disubstituted, halogen atoms, in particular chlorine, alkyl of 1 to 4 carbon atoms, and alkoxy of 1 to 4 carbon atoms, in particular the methyl ethyl and methoxy group are the most effective substituents, the two substituents at R being either identical or differing from each other.

The new acaricidal compounds of Formula I are prepared by reacting a correspondingly substituted thio-phenol or thio-naphthol with a 1,2-ethylene halogeno-hydrin, preferably with ethylene chloro-hydrin or ethylene bromo-hydrin, in the presence of an acid acceptor such as sodium hydroxide, an alkali metal alcoholate such as sodium methylate or a tertiary organic base such as triethyl amine, as well as in the presence of an inert solvent. Solvents suitable for use in the preparation of the compounds of Formula I are water or organic solvents having boiling points in the range of 0° to 150° C. The β-hydroxy-ethyl phenyl-ether or β-hydroxy-ethyl naphthyl-ether obtained in this way is converted with a brominating agent such as phosphorus tribromide, in an organic solvent and in the presence of an organic base, to form the final product of Formula I. This reaction takes place preferably at a temperature between 0 and 25° C.

According to a modification of this process, the new acaricidal compounds of Formula I can also be prepared by reacting a substituted thio-phenol or thio-naphthol in an organic solvent, such as benzene, chlorobenzene and the like, at a temperature between 50 and 200° C. with ethylene oxide and brominating the resulting hydroxy-ethyl phenyl-sulfides or hydroxy-ethyl naphthyl-sulfides as described hereinbefore.

Finally, the new compounds of Formula I can be obtained by reacting a substituted thio-phenol or thio-naphthol directly with an excess of 1,2-dibromo-ethane in an organic solvent and preferably in the presence of a base such as sodium methylate or sodium ethylate, at a temperature between 20 and 150° C. Acaricidal compositions containing the new thio-ethers according to the invention are prepared by thorough mixing and grinding of an active compound of Formula I with suitable carrier substances, optionally with the addition of adhesives, or dispersants or solvents. These compositions can be prepared in solid form as dusting powders or scattering agents; or in the form of concentrates of the active ingredients, which can be dispersed in water, such as wettable powders, pastes or emulsions; or in liquid form as solutions, or in formulations suitable for spraying as aerosols, mists, or as fumigation agents.

The invention is further illustrated by the following non-limitative examples in which temperatures are given in degrees centigrade, and parts and percentages are given by weight unless expressly stated otherwise. The relationship between parts by weight and parts by volume is that of grams (g) to milliliters (ml.).

EXAMPLE 1

(a) m-Thiocresol

Similar to the method described in Org. Synth. 27, 81, a solution of 126 parts of sodium xanthate, prepared by mixing at temperatures below 40° C., $CS_2$ with alcoholic NaOH solution, in 180 parts of water is reacted at 40–45° C. with the cold diazonium solution of m-toluidine. The oily m-tolyl ethyl xanthate so obtained is separated and dissolved in ethanol. To the boiling alcoholic xanthate solution sodium hydroxide pellets are added and the major part of the alcohol is distilled off. The residue is taken up in water and the aqueous solution is made strongly acid to Congo red paper using 6 N sulfuric acid and after addition of zinc dust the m-thiocresol is distilled with steam.

(b) 2-(m-Tolylthio)-ethanol 31.5 parts m-thiocresol were dissolved into the solution prepared from 18.5 parts of KOH and 70 parts by volume of water. To this solution were added 21 parts of ethylene chlorohydrin at 70°, then the reaction mixture was reacted 1.5 hours at 90°. The product was extracted with benzene and distilled at 126° C./1 torr.

(c) S-β-bromoethyl-S-m-tolyl-sulfide 20 parts phosphorus tribromide in 15 parts by volume of benzene were mixed with 2.7 parts pyridine under cooling in an ice bath. To this solution was added during 1 hour at —5° to 0° a mixture of 34.5 parts of S-2-hydroxyethyl-S-m-tolylsulfide and 1.4 parts of pyridine. The reaction mixture was stirred 1 hour with cooling as above and then allowed to stand at room temperature. The reaction mixture was treated with ice water containing hydrochloric acid and extracted with benzene. The benzene was then distilled off and the S-β-bromoethyl-S-m-tolylsulfide removed by distillation at 112–114°/1.5 torr.

EXAMPLE 2

A solution of 500 parts of m-thio-cresol and 218 parts of sodium methylate (about 4 mols each) in 1000 parts by volume of ethanol is poured into a mixture of 2300 parts (12.2 mols) of ethylene bromide and 1500 parts by volume of ethanol, while cooling with a mixture of ice and saturated sodium chloride solution to a temperature of 15 to 17°.

After completion of the reaction, the major portion of the solvent is distilled off in vacuo, the residue is mixed with water and the oily phase, which separates, is dissolved in ether. The ether solution is washed with water and dried with sodium sulfate; the ether is distilled off in vacuo and the residue fractionated in high vacuum.

The fraction boiling at 88°/0.04 torr is collected. It consists of S-β-bromoethyl-S-3-methylphenyl-sulfide.

The following acaricidally active compounds are produced from the correspondingly substituted starting materials by the procedure given in the above examples:

S-β-bromoethyl-S-2-chloro-phenyl-sulfide
S-β-bromoethyl-S-3-chloro-phenyl-sulfide
S-β-bromoethyl-S-3-methoxycarbonyl-phenyl-sulfide
S-β-bromoethyl-S-3-methoxy-phenyl-sulfide
S-β-bromoethyl-S-3-chloro-4-methoxy-phenyl-sulfide
S-β-bromoethyl-S-3-methyl-phenyl-sulfide
S-β-bromoethyl-S-3,4-di-methyl-phenyl-sulfide
S-β-bromoethyl-S-methyl-4-methoxy-phenyl-sulfide
S-β-bromoethyl-S-2-methoxycarbonyl-phenyl-sulfide
S-β-bromoethyl-S-2-chloro-phenyl-sulfide
S-β-bromoethyl-S-2,5-dichloro-phenyl-sulfide
S-β-bromoethyl-S-2-methyl-phenyl-sulfide
S-β-bromoethyl-S-2-methyl-5-isopropyl-phenyl-sulfide
S-β-bromoethyl-S-2-methyl-4-methoxy-phenyl-sulfide
S-β-bromoethyl-S-2-methoxy-phenyl-sulfide
S-β-bromoethyl-S-2,4-di-methoxy-phenyl-sulfide
S-β-bromoethyl-S-2,5-di-methoxy-phenyl-sulfide
S-β-bromoethyl-S-2-methoxy-5-chloro-phenyl-sulfide
S-β-bromoethyl-S-3-ethoxycarbonyl-phenyl-sulfide
S-β-bromoethyl-S-isopropoxycarbonyl-phenyl-sulfide
S-β-bromoethyl-S-4-nitrophenyl-sulfide
S-β-bromoethyl-S-3-nitrophenyl-sulfide
S-β-bromoethyl-S-2-nitrophenyl-sulfide
S-β-bromoethyl-S-4-methoxycarbonyl-phenyl-sulfide
S-β-bromoethyl-S-4-methoxy-phenyl-sulfide
S-β-bromoethyl-S-3-methyl-6-methoxy-phenyl-sulfide
S-β-bromoethyl-S-2-chloro-5-methyl-phenyl-sulfide
S-β-bromoethyl-S-3-n-propoxycarbonyl-phenyl-sulfide
S-β-bromoethyl-S-3-n-butoxycarbonyl-phenyl-sulfide
S-β-bromoethyl-S-1-naphthyl-sulfide
S-β-bromoethyl-S-2-napthyl-sulfide
S-β-bromoethyl-S-4-formyl-phenyl-sulfide
S-β-bromoethyl-S-3-bromo-phenyl-sulfide
S-β-bromoethyl-S-4-chloro-1-naphthyl-sulfide
S-β-bromoethyl-S-2-chloro-1-naphthyl-sulfide
S-β-bromoethyl-S-4-nitro-1-naphthyl-sulfide
S-β-bromoethyl-S-6,8-dinitro-1-naphthyl-sulfide
S-β-bromoethyl-S-1-ethoxy-2-naphthyl-sulfide
S-β-bromoethyl-S-3-methoxycarbonyl-2-naphthyl-sulfide
S-β-bromoethyl-S-2,4-dibromo-1-naphthyl-sulfide The thiophenols used as starting materials in the production of these compounds are prepared as described in Org. Synth. [viz. Example 1 step (a)] from the correspondingly well-known starting materials.

The invention is further illustrated by the following nonlimitative examples. Parts are given therein as parts by weight and temperatures by centigrade.

EXAMPLE 3

Emulsifiable solution:                          Parts
    2-bromoethyl-m-tolyl-sulfide _____ 50
    Xylene _____ 10
    Isopropyl alcohol _____ 50
    Polyoxyethylene alkylphenol _____ 25

The above chemicals are mixed to form an emulsifiable solution which is diluted wtih water for use as an acaricidal spray.

EXAMPLE 4

Wettable powder:                                Parts
    2-bromoethyl-m-tolyl-sulfide _____ 20
    Diatomaceous earth _____ 20
    Dehydrated silicicacid _____ 10
Mixture of bentonite and kaoline:
    Weight ratio 1:1 _____ 45
Mixture of:
    Sodium lignin sulfonate, sodium dibutyl-naphthalene sulfonate, weight ratio 1:1:1 _____ 5

The above chemicals are mixed and crushed to form fine powder which is diluted with water for use as acaricide.

EXAMPLE 5

Dusting powder:                                 Parts
    2-bromoethyl-m-tolyl-sulfide _____ 5
    Talcum _____ 95

The above chemicals are mixed and crushed to form a fine powder, ready for use as acaricide.

EXAMPLE 6

Wettable powders 25 parts of S-β-bromoethyl-S-3-chloro-phenyl-sulfide are mixed and ground with 5 parts of sulfated hexadecyl glycol ether and 2.5 parts of a dispersant consisting of the condensation product of naphthalene sulfonic acid and formaldehyde and 67.5 parts of neutral sodium aluminium silicate. The 25% wettable powder obtained has good suspensibility and low foam formation.

Such wettable powders can be diluted with water to form suspensions with a concentration of 0.1 to 1% active substance. These suspensions are used to combat mites and their stages of development on vegetables and ornamentals.

EXAMPLE 7

Emulsion concentrates 5 parts of 4,4'-dichlorobenzilic-acid-isopropyl ester, 5 parts of 4,4'-dichlorobenzilic-acid-ethyl ester, and 10 parts of S-β-bromoethyl-S-3-methoxy-phenyl-sulfide are dissolved in 60 parts of xylene and 20 parts of nonyl phenyl polyglycol ether containing an average of 15 ether oxygen atoms as emulsifying agent. An emulsifiable solution is obtained which can be diluted with water to any concentration desired. The diluted agent serves for combating acaricides, for instance in fruit groves.

EXAMPLE 8

Emulsion concentrates 10 parts of S-β-bromoethyl-S-1-naphthyl-sulfide are mixed with/or dissolved in 20 parts of xylene, 20 parts of ethyl acetate, 30 parts of acetone and 20 parts of nonylphenyl polyethylene glycol ether (about 15 mols of ethylene oxide per mol of nonylphenol) as emulsifying agent. A 10% emulsion concentrate is obtained which can be diluted with water to any concentration desired. These emulsions are used to combat mites on plums and roses.

EXAMPLE 9

Emulsifiable solution: Parts
- 2-bromoethyl-3-chlorophenyl sulfide _____ 30
- Xylene _____ 10
- Isopropyl alcohol _____ 35
- Polyoxyethylene alkylphenol _____ 25

The above chemicals are mixed to form an emulsifiable solution which is diluted with water for spraying.

EXAMPLE 10

Wettable powder: Parts
- 2-bromoethyl-2-chlorophenyl sulfide _____ 20
- Diatomaceous earth _____ 20
- Anhydrous silicic acid _____ 10
- Bentonite,[1] kaoline [1] _____ 45
- Sodium lignin sulfonate,[1] sodium dibutyl naphthalene sulfonate [1] _____ 5

[1] Mixture of the same weight of each.

The above chemicals are mixed and crushed to form fine powder which is diluted with water for use.

EXAMPLE 11

Dusting powder: Parts
- 2-bromoethyl-2-chlorophenyl sulfide _____ 2.5
- 2-bromoethyl-3-chlorophenyl sulfide _____ 2.5
- Talc _____ 95

The above chemicals are mixed and crushed to form fine powder which is applied as it is for use.

EXAMPLE 12

Emulsifiable solution: Parts
- 2-bromoethyl - 3 - methoxycarbonylphenyl sulfide _____ 30
- Xylene _____ 10
- Isopropyl alcohol _____ 35
- Polyoxyethylene alkylphenol _____ 25

The above chemicals are mixed to form an emulsifiable solution which is diluted with water for spraying.

EXAMPLE 13

Wettable powder: Parts
- 2-bromoethyl-3,4-dimethylphenyl sulfide _____ 20
- Diatomaceous earth _____ 20
- Dehydrated silicic acid _____ 10
- Bentonite,[1] kaoline [1] _____ 45
- Sodium ligninsulfonate,[2] sodium dibutylnaphthalene sulfonate [2] _____ 5

[1] Mixture of the same weight of each.
[2] Mixture of equal amounts of each.

The above chemicals are mixed and crushed to form fine powder which is diluted with water for use.

EXAMPLE 14

Dusting powder: Parts
- 2-bromoethyl-3-ethoxycarbonylphenyl sulfide __ 3
- Mixture of talc and kaoline _____ 97

The above chemicals are mixed and crushed to form fine powder which is applied as it is for use.

The efficacy of compounds according to the invention as acaricides is shown in the following experiments:

Experiment I

Six to eight female adults of *Tetranychus telarius* L. were placed on the first leaves (2 leaves) cut into squares of (2.5 cm.)$^2$ of French dwarf bean (variety: Top Crop) grown in a pot of 6 cm. diameter. After two days oviposition, the adults were removed and the eggs were counted. Then the leaves were dipped into the test solution for 10 seconds. The unhatched eggs were counted through the binocular microscope six to eight days after the treatment and having grown in a vinyl covered house, that is, after hatching of the control.

TABLE 1

| | *Tetranychus telarius* L. | |
|---|---|---|
| | Mortality of adults, percent | Mortality of eggs, percent |
| Conc. (percent): | | |
| 0.05 | 9 | 99 |
| 0.025 | 8 | 100 |
| 0.0125 | | 95 |
| 0.00375 | | 89 |
| 0.0025 | | 80 |

A series of test solutions were prepared by diluting the solution of Example 3 with water sufficiently to obtain the concentrations given in the first column of the table.

Experiment II 2-bromoethyl-4-chlorophenyl sulfide, an isomer of the above-mentioned 2-chloro and 3-chloro-phenyl sulfides, is well-known, and experiments were previously made against *Aphis fabae* and *Macrosiphum pisi*, but did not go beyond preceiving its phytotoxicity to plants. (Chemical Abstracts: Vol. 53, p. 7493, 1959.)

The unexpectedly very satisfactory acaricidal ovicidal effect of the two 2-chloro and 3-chloro compounds of this invention and the unpromising effect of the above-mentioned known 4-chloro compound which was only equal to that of the 3-chloro compound in more than 100 times the concentration of the latter are shown in the following experiment:

The first leaves (2 leaves), cut into squares of 2.5 cm. by 2.5 cm. of the French dwarf bean (variety: Top Crop)

grown in a pot of 6 cm. diameter were infested with six to eight female adults of *Tetranychus telarius* L.

After two days of oviposition, the adults were removed and the eggs were counted. The leaves were then dipped into the test solution for 10 seconds. The unhatched eggs were counted through a binocular microscope after leaving in a plastic covered house for 6-8 days after treating, that is, after hatching of the mites on the untreated leaves.

TABLE 2.—OVICIDAL EFFECT OF 2-BROMOETHYL CHLOROPHENYL SULFIDES

| Conc. (percent): | Position of Cl | | |
|---|---|---|---|
| | Ortho | Meta | Para |
| | *Percent* | *Percent* | *Percent* |
| 0.1 | 98 (100) | 97 (100) | 66 (—) |
| 0.05 | 97 | 96 | |
| 0.025 | 97 | 91 | |
| 0.0125 | 85 | 85 | |
| 0.0063 | 77 | 66 | |

Figures in parentheses denote the percentage of acaricidal effect against the adult spider mites.

As a particularly advantageous, unexpected feature, the two compounds of this invention showed no phytotoxicity to the crop tested.

Experiment III

Test against eggs of *Tetranychus telarius* L.—The first leaves (2 leaves) cut into squares (2.5 cm.$^2$ of the French dwarf bean (variety: Top Crop) grown in a pot of 6 cm. diameter were infested with 6-8 female adults of *Tetranychus telarius* L. After two days' oviposition, the adults were removed and the eggs were counted. Then the leaves were dipped into the test solution for 10 seconds. The unhatched eggs were counted through a binocular microscope in six to eight days after the treatment and having grown in the vinyl house, that is, after hatching of the control.

Experiment V

Test against female adults of *Tetranychus telarius* L.—The leaves of French dwarf bean, prepared in the same way as in Experiment III, were infested with ten female adults. After the mites became stationary, the leaves were dipped into the test solution for ten seconds. After two days the survivors and the dead were counted.

TABLE 5

| Compound (Conc.) | Mortality (percent) | | |
|---|---|---|---|
| | 0.1% | 0.05% | 0.025% |
| 2-bromoethyl-4-nitrophenyl sulfide | 100.0 | | |
| 2-bromoethyl-3-methoxyphenyl sulfide | 100.0 | | |
| 2-bromoethyl-2-nitrophenyl sulfide | 96.8 | | |
| 2-bromoethyl-2-methoxyphenyl sulfide | 100.0 | 100.0 | 100.0 |
| 2-bromoethyl-α-naphthyl sulfide | 100.0 | 100.0 | 100.0 |
| 2-bromoethyl-β-naphthyl sulfide | 100.0 | 92.0 | 80.0 |
| 2-bromoethyl-4-methoxyphenyl sulfide | 100.0 | | |

As shown in the above, the compounds of this invention are very ovicidal as well as acaricidal, and moreover have the peculiar property that the eggs laid by the treated female adults do not hatch. Therefore the compounds of this invention can prevent the mites from multiplying.

The acaricidally active compounds of this invention can be used as miticides for agricultural and horticultural use by mixing one or several of them with carriers, i.e. agents inert to the said active compounds and serving only to convey them to their destination.

Furthermore these compounds can be made into far stronger miticides which kill adults and larvae as well as eggs by using them in combination with another compound of acaricidal property.

More particularly, by mixing a compound of this invention as active ingredient with other compounds which are active especially against adults of mites and formulating the mixture into emulsifiable solution, dusting powder, or

TABLE 3

| Compound (Conc.) | Unhatched Eggs (Percent) | | | | | |
|---|---|---|---|---|---|---|
| | 0.1% | 0.05% | 0.025% | 0.0125% | 0.00625% | 0.003125% |
| 2-bromoethyl-4-formylphenyl sulfide | 97 | 82 | 93 | | | |
| 2-bromoethyl-4-nitrophenyl sulfide | 100 | 93 | 100 | 100 | 91 | 66 |
| 2-bromoethyl-3-methoxycarbonylphenyl sulfide | 82 | 87 | 98 | 95 | 97 | 94 |
| 2-bromoethyl-3-methoxyphenyl sulfide | 92 | 94 | 88 | 94 | 81 | 87 |
| 2-bromoethyl-2-methoxycarbonylphenyl sulfide | 98 | 80 | 96 | 89 | 87 | |
| 2-bromoethyl-2-methoxyphenyl sulfide | 100 | 99 | 96 | 93 | 93 | 88 |
| 2-bromoethyl-3-ethoxycarbonylphenyl sulfide | 98 | 95 | 96 | 93 | | |
| 2-bromoethyl-3-isopropoxycarbonylphenyl sulfide | 96 | 75 | 55 | 58 | | |
| 2-bromoethyl-3-n-propoxycarbonylphenyl sulfide | 95 | 93 | 100 | 81 | | |
| 2-bromoethyl-3-n-butoxycarbonylphenyl sulfide | 89 | 95 | 89 | | | |
| 2-bromoethyl-4-methoxycarbonylphenyl sulfide | 98 | | | | | |
| 2-bromoethyl-3-methyl-6-methoxyphenyl sulfide | 92 | 95 | 81 | | | |
| 2-bromoethyl-3,4-dimethylphenyl sulfide | 96 | | 92 | 89 | 97 | 100 |
| 2-bromoethyl-2-methyl-4-methoxyphenyl sulfide | 90 | 84 | 91 | 79 | 67 | 40 |
| 2-bromoethyl-2,4-dimethoxy-phenyl sulfide | 94 | 87 | 97 | 96 | 81 | |
| 2-bromoethyl-α-naphthyl sulfide | 94 | 92 | 96 | 100 | 96 | 97 |
| 2-bromoethyl-β-naphthyl sulfide | 97 | 97 | 100 | 100 | 97 | |

Experiment IV

Test against eggs in the body of *Tetranychus telarius* L.—The leaves of the French dwarf bean, prepared in the same way as in Experiment III, were infested with ten female adults.

After the mites became stationary, the leaves were dipped into the test solution for 10 seconds. After two days the survivors were removed and the eggs were counted, and after an additional seven days the unhatched eggs were counted.

wettable powder for use in orchards and the like, not only eggs but also adults can be eradicated completely.

We claim:
1. A compound of the formula

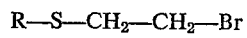

R—S—CH$_2$—CH$_2$—Br wherein R represents a member selected from the group consisting of
 (a) mono-substituted phenyl having one of the following substituents: formyl and alkoxy-carbonyl of from 2 to 5 carbon atoms,

TABLE 4

| Compound active ingredient | Conc. (percent) of active ingredient | Eggs laid after 2 days | Eggs unhatched after further 7 days | Percent of eggs unhatched |
|---|---|---|---|---|
| 2-bromoethyl-3-methoxycarbonylphenyl sulfide | 0.04 | 38 | 36 | 94.7 |
| | 0.02 | 57 | 56 | 98.2 |
| | 0.01 | 45 | 45 | 100.0 |
| Control treated with water | | 129 | 1 | 0.8 |

(b) mono-substituted phenyl having one of the following substituents in one of the positions ortho and meta to —S—CH$_2$—CH$_2$—Br as follows: halogen, alkoxy of from 1 to 4 carbon atoms and alkyl of from 1 to 4 carbon atoms,
(c) unsubstituted naphthyl,
(d) mono-substituted naphthyl substituted with one of the following substituents: halogen, nitro, formyl, alkyl of from 1 to 4 carbon atoms, alkoxy of from 1 to 4 carbon atoms, alkoxy-carbonyl of from 2 to 5 carbon atoms, and
(e) disubstituted naphthyl substituted with two of the following substituents: halogen, lower alkyl, lower alkoxy, "halogen" being throughout selected from the group consisting of F, Cl and Br.
2. S-β-bromoethyl-S-2-chlorophenyl-sulfide.
3. S-β-bromoethyl-S-2-methyl-phenyl-sulfide.
4. S-β-bromoethyl-S-2-methoxy-phenyl-sulfide.
5. S-β-bromoethyl-S-3-chloro-phenyl-sulfide.
6. S-β-bromoethyl-S-3-methyl-phenyl-sulfide.
7. S-β-bromoethyl-S-3-methoxy-phenyl-sulfide.
8. S-β-bromoethyl-S-1-naphthyl-sulfide.
9. S-β-bromoethyl-S-2-naphthyl-sulfide.

References Cited

Drain et al., "J. Med. Chem." vol. 6, pp. 63–65 (1963).
Musgrave et al., Chem. Abst., vol. 53, p. 7493C.
Baddeley et al., J. Chem. Soc. (1933), pp. 46–48.
Drain et al., Chem. Abst., vol. 58, p. 11247g (May 1963).
Greenwood et al., J. Chem. Soc. (1953), pp. 1514–1519.

CHARLES B. PARKER, *Primary Examiner.*

J. P. BRUST, *Examiner.*

D. R. PHILLIPS, *Assistant Examiner.*